United States Patent [19]

Dingman

[11] 4,421,224
[45] Dec. 20, 1983

[54] DRIVEN ROLLER FOR ACCUMULATOR CONVEYOR

[76] Inventor: Robert D. Dingman, 28118 Wildwood Trail, Farmington Hills, Mich. 48018

[21] Appl. No.: 325,748

[22] Filed: Nov. 30, 1981

[51] Int. Cl.³ .............................................. B65G 13/06
[52] U.S. Cl. .................................................. 198/781
[58] Field of Search ..................... 198/781, 783, 789; 464/147, 901

[56] References Cited

U.S. PATENT DOCUMENTS

| | | | |
|---|---|---|---|
| 3,327,837 | 6/1967 | Covell | 198/781 |
| 3,513,960 | 5/1970 | Adams | 198/781 |
| 3,729,088 | 4/1973 | Stein et al. | 198/781 |
| 3,867,748 | 2/1975 | Miller | 198/789 |
| 4,366,899 | 1/1983 | Doro | 198/781 |

Primary Examiner—Joseph E. Valenza
Assistant Examiner—Jonathan D. Holmes
Attorney, Agent, or Firm—Robert D. Dingman

[57] ABSTRACT

A live roller drive mechanism for use in an accumulating conveyor comprising a driving roller and a load supporting driven roller. A drive sleeve is disposed loosely over the end of the driven roller and is coupled to the driven roller in such a way as to permit relative annular and axial motion. The drive sleeve is spring urged into face-to-face engagement with an annular member mounted on the driving roller to provide a slip-friction drive.

1 Claim, 7 Drawing Figures

DRIVEN ROLLER FOR ACCUMULATOR CONVEYOR

This is an invention of a system formed by using readily available hardware and fabricated components in an unique arrangement to provide an accumulating chain driven live roller conveyor having no clutch/declutch action, no magnetic, hydraulic, pneumatic nor electrical devices, featuring easy maintenance, low tolerances, good protection from contaminates and relatively low costs.

The system incorporates the use of (1) Slip-friction drive faces of different molecular composition to provide a minimum of frictional resistance and wear. (2) A free-floating driven disc to provide perfect mating of the drive surfaces which allows lower manufacturing tolerances of all components. (3) The slip-friction drive faces maintain contact by using a compression spring permitting the free-float feature and having adjustment of the spring's compressed length to vary the torque transmission by the drive faces.

I am aware of the following U.S. Patents: Nos. 3,327,837; 3,513,960; 3,605,990; 3,610,406; and 3,729,088.

This invention is directed to a chain driven live roller conveyor, single strand or roller-to-roller chain drive, for use in an accumulation application. All drawings, herein, depict the roller-to-roller type.

DESCRIPTION OF THE PREFERRED EMBODIMENT

Figure 1:
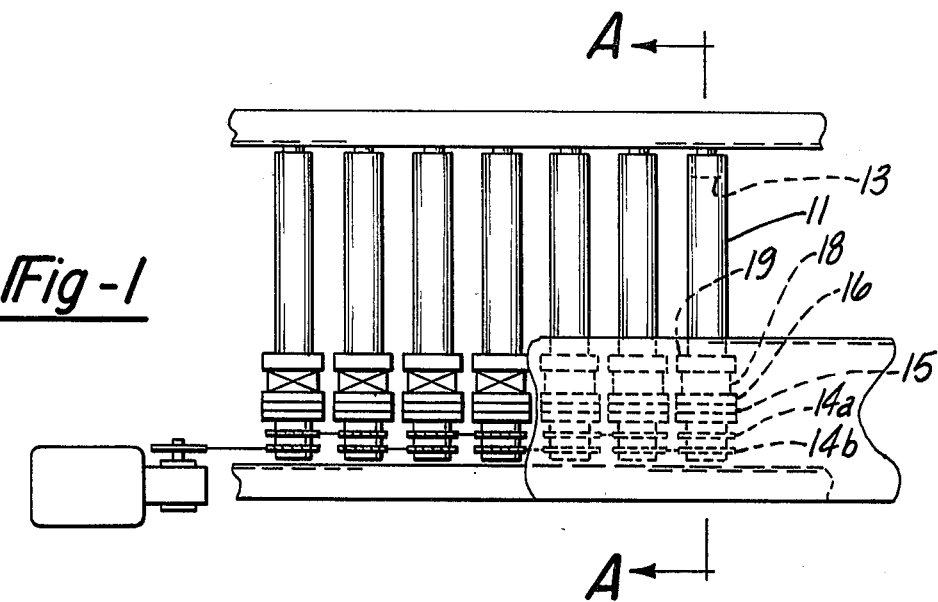
FIG. 1 is a plan view with a portion of the guard cover broken away to show the roller-to-roller chain drive application.

Driven roller 11 is rotatably supported on a fixed nonrotating hexagon shaft 12 by a pair of ball bearings 13. The roller 11 is driven by a driving roller 14 which is also rotatably supported on the same hexagon shaft 12 by a pair of ball bearings 13'. The driving roller 14 has mounted therewith a driving sprocket 14a, a driven sprocket 14b and a steel annular member 14c with a polished face 14d. The sprockets 14a and 14b provides for chain drive connection with consecutive rollers.

Figure 2:
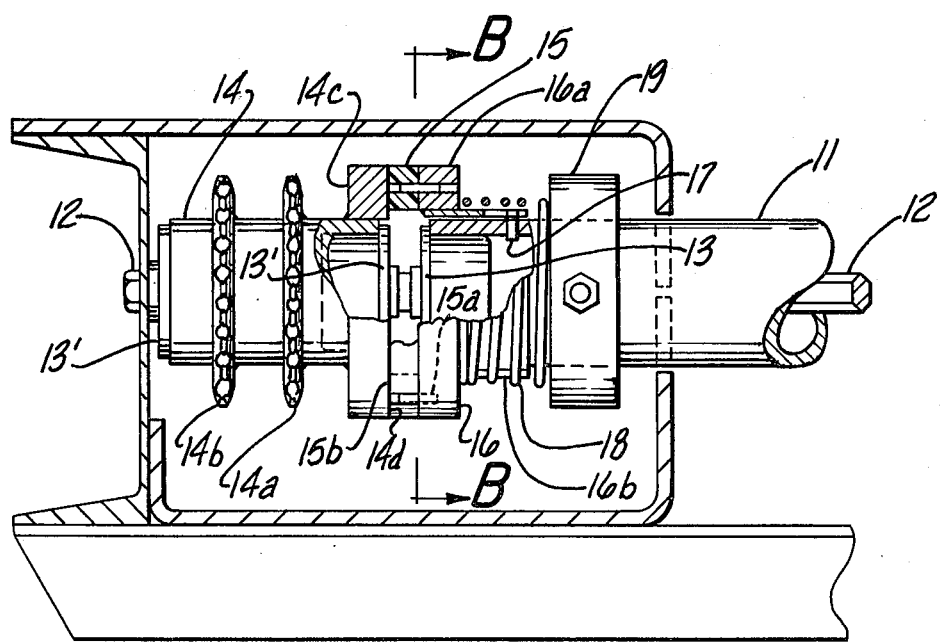
FIG. 2 is a view partially broken away and in section thru the shaft of the roller assembly, along line A—A of FIG. 1.
Figure 3:
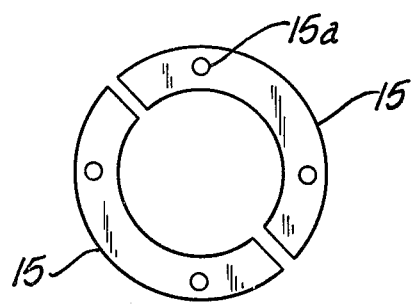
FIG. 3 is a transverse view showing the friction face of the replaceable inserts.
Figure 4:
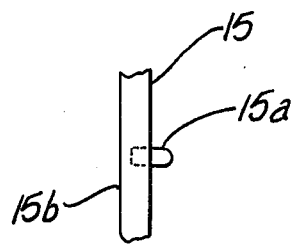
FIG. 4 is a partial end view of FIG. 3 showing the locator pin.
Figure 6:
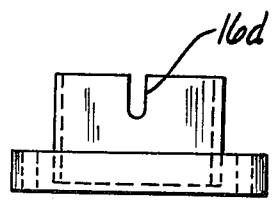
FIG. 6 is a plan view of FIG. 5 showing a driving slot.
Figure 5:
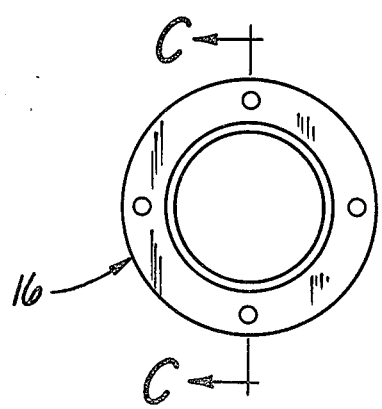
FIG. 5 is a transverse view showing the face of the floating drive sleeve, taken along line B—B of FIG. 2.
Figure 7:
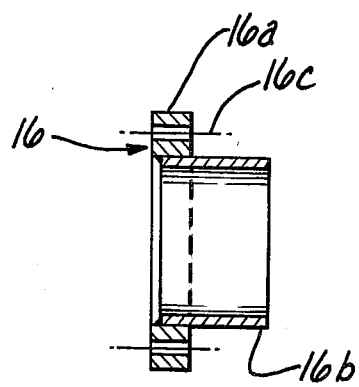
FIG. 7 is a section view along line C—C of FIG. 5.

The annular member 14c on driving roller 14 transmits limited torque by frictional engagement with an annular torque transmitting member 15 which includes two removable and replaceable doughnut halves 15 made of compression molded ultra high molecular weight (UHMW) resin, the pellet form of which, is known as linear polyethylene as manufactured by Hercules, Inc. Hercules' trade name is Hifax #1900 Resin. The member 15 has an axially disposed annular surface 15b for frictional engagement with the polished face 14d. The member 15 also has pins 15a which are used for location and transmitting torque, see FIGS. 3 & 4. The pins 15a insert into slip-fit mating holes 16c in the annular driving member 16a of the floating drive sleeve 16 which fits loosely over the end of the driven roller 11 permitting approximately 0.3 to 0.8 degrees of misalignment. The floating drive sleeve 16 is drivingly engaged to driven roller 11 by a pin 17 and slot 16d connection. The floating drive sleeve 16 is spring loaded by a coil spring 18 seated concentrically between the annular driving member 16a and a set collar 19. The spring is held concentric by sliding loosely over the tube 16b of the floating drive sleeve 16, see FIG. 2.

I claim:

1. For use in an accumulation type of conveyor with one or more live rollers, a live roller drive mechanism comprising: a driving roller and a driven roller mounted for rotation on a fixed shaft, a driving member mounted on said driving roller and having an axially disposed annular surface, a drive sleeve disposed loosely over the end of the driven roller to permit a limited degree of angular misalignment relative to said driven roller, means coupling said drive sleeve to said driven roller for imparting rotative motion thereto and for permitting angular and axial motion of the drive sleeve relative to the driven roller, an annular torque transmitting member carried by said drive sleeve having an axially disposed annular surface positioned in face-to-face opposition with the annular surface on said driving member, and a spring retained on said driven roller and urging the torque transmitting member into face-to-face engagement with said driving member.

* * * * *